(12) United States Patent
Mitu et al.

(10) Patent No.: US 7,451,293 B2
(45) Date of Patent: Nov. 11, 2008

(54) ARRAY OF BOOLEAN LOGIC CONTROLLED PROCESSING ELEMENTS WITH CONCURRENT I/O PROCESSING AND INSTRUCTION SEQUENCING

(75) Inventors: Bogdan Mitu, Campbell, CA (US); Gheorghe Stefan, Nashua, NH (US); Dan Tomescu, Richmond Hill (CA)

(73) Assignee: Brightscale Inc., Sunnyvale, CA (US)

( * ) Notice: Subject to any disclaimer, the term of this patent is extended or adjusted under 35 U.S.C. 154(b) by 0 days.

(21) Appl. No.: 11/584,480

(22) Filed: Oct. 19, 2006

(65) Prior Publication Data
US 2007/0130444 A1 Jun. 7, 2007

Related U.S. Application Data

(60) Provisional application No. 60/729,178, filed on Oct. 21, 2005.

(51) Int. Cl.
*G06F 15/80* (2006.01)
(52) U.S. Cl. .......................... 712/16; 712/223
(58) Field of Classification Search .............. None
See application file for complete search history.

(56) References Cited

U.S. PATENT DOCUMENTS

| | | | |
|---|---|---|---|
| 3,308,436 A * | 3/1967 | Borck, Jr. et al. ............ 712/10 |
| 4,212,076 A * | 7/1980 | Conners ...................... 708/130 |
| 4,783,738 A * | 11/1988 | Li et al. ........................ 712/21 |
| 6,173,386 B1 | 1/2001 | Key et al. |
| 6,336,178 B1 | 1/2002 | Favor et al. |
| 6,658,578 B1 | 12/2003 | Laurenti et al. |
| 6,938,183 B2 | 8/2005 | Bickel et al. |
| 2002/0133688 A1* | 9/2002 | Lee et al. ....................... 712/22 |
| 2002/0174318 A1* | 11/2002 | Stuttard et al. ................ 712/13 |
| 2004/0006584 A1 | 1/2004 | Vandeweerd et al. |

* cited by examiner

*Primary Examiner*—Kenneth S Kim
(74) *Attorney, Agent, or Firm*—DLA Piper LLP (US)

(57) ABSTRACT

A computer processor having an integrated instruction sequencer, array of processing engines, and I/O controller. The instruction sequencer sequences instructions from a host, and transfers these instructions to the processing engines, thus directing their operation. The I/O controller controls the transfer of I/O data to and from the processing engines in parallel with the processing controlled by the instruction sequencer. The processing engines themselves are constructed with an integer arithmetic and logic unit (ALU), a 1-bit ALU, a decision unit, and registers. Instructions from the instruction sequencer direct the integer ALU to perform integer operations according to logic states stored in the 1-bit ALU and data stored in the decision unit. The 1-bit ALU and the decision unit can modify their stored information in the same clock cycle as the integer ALU carries out its operation. The processing engines also contain a local memory for storing instructions and data.

17 Claims, 4 Drawing Sheets

ARRAY OF BOOLEAN LOGIC CONTROLLED PROCESSING ELEMENTS WITH CONCURRENT I/O PROCESSING AND INSTRUCTION SEQUENCING

This application claims the benefit of U.S. Provisional Patent Application No. 60/729,178, filed on Oct. 21, 2005, the disclosure of which is hereby incorporated by reference in its entirety and for all purposes.

BRIEF DESCRIPTION OF THE INVENTION

The invention relates generally to computer processors. More specifically, the invention relates to an integrated processor array, instruction sequencer, and I/O controller.

BACKGROUND OF THE INVENTION

The ever-increasing requirements for computational speed have generated unyielding demand for ever-faster and more efficient processors. In particular, processors are increasingly asked to perform mathematical operations, such as calculations and other data manipulation, at greater rates of speed. Processors are also increasingly required to transfer more data at higher rates of speed, as multimedia and other applications employ larger files storing greater amounts of data.

Accordingly, continuing efforts exist to improve the speed and performance of computer processors. In particular, efforts exist to improve both the speed and efficiency with which processors manipulate data, and the speed at which processors transfer I/O data.

SUMMARY OF THE INVENTION

The invention can be implemented in numerous ways, including as a method, system, and device. Various embodiments of the invention are discussed below In one embodiment, a computer system comprises an instruction sequencing unit configured to sequence instructions for manipulating data and to transmit the sequenced instructions. The computer system also includes an array of processing engines configured to receive instructions corresponding to the sequenced instructions, each processing engine of the array of processing engines being configured to receive the data. Each processing engine has a first memory configured to store the data, a decision unit configured to store decision data, and a Boolean unit configured to store a logic state and to modify the logic state according to the received instructions. Each processing engine also has an integer unit configured to conditionally perform integer operations on the stored data according to the stored decision data, the received instructions, and the logic state, so as to generate integer result data, as well as a second memory configured to store I/O data. The Boolean unit is configured to modify the logic state in the same clock cycle as the integer unit performs the integer operations. The computer system also includes an I/O controller configured to transmit the I/O data to, and receive the I/O data from, the array of processing engines.

In another embodiment, a computer system comprises a processing array having processing engines serially interconnected in rows and columns so as to form rows of processing engines and columns of processing engines, the processing array configured to execute I/O operations by shifting I/O data sequentially through the columns of processing engines, to shift computation data sequentially across the rows of processing engines, and to execute computation operations upon the shifted computation data in parallel with the I/O operations. The computer system also includes an instruction sequencing unit configured to sequence instructions and to transfer the instructions to the processing engines of the processing array so as to control the computation operations. It also includes an I/O controller configured to exchange the I/O data with the processing engines of the processing array.

Other aspects and advantages of the invention will become apparent from the following detailed description taken in conjunction with the accompanying drawings which illustrate, by way of example, the principles of the invention.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF THE INVENTION

In one sense, the invention relates to a computer processor having an integrated instruction sequencer, array of processing engines, and I/O controller. The instruction sequencer sequences instructions from a host and transfers these instructions to the processing engines, thus directing their operation. The I/O controller controls the transfer of I/O data to and from the processing engines in parallel with the processing controlled by the instruction sequencer. To facilitate the efficient execution of instructions from the instruction sequencer and the exchange of I/O data with the I/O controller, the processing engines themselves are constructed with an integer arithmetic and logic unit (ALU), a 1-bit ALU, a decision unit, and registers. Instructions from the instruction sequencer direct the integer ALU to perform integer operations according to a logic state stored in the 1-bit ALU and data stored in the decision unit. The 1-bit ALU and the decision unit can modify their stored information in the same clock cycle as the integer ALU carries out its operation, allowing for faster and more efficient processing. The processing engines also contain a local memory for storing instructions and data to be shifted among the engines.

Figure 1:
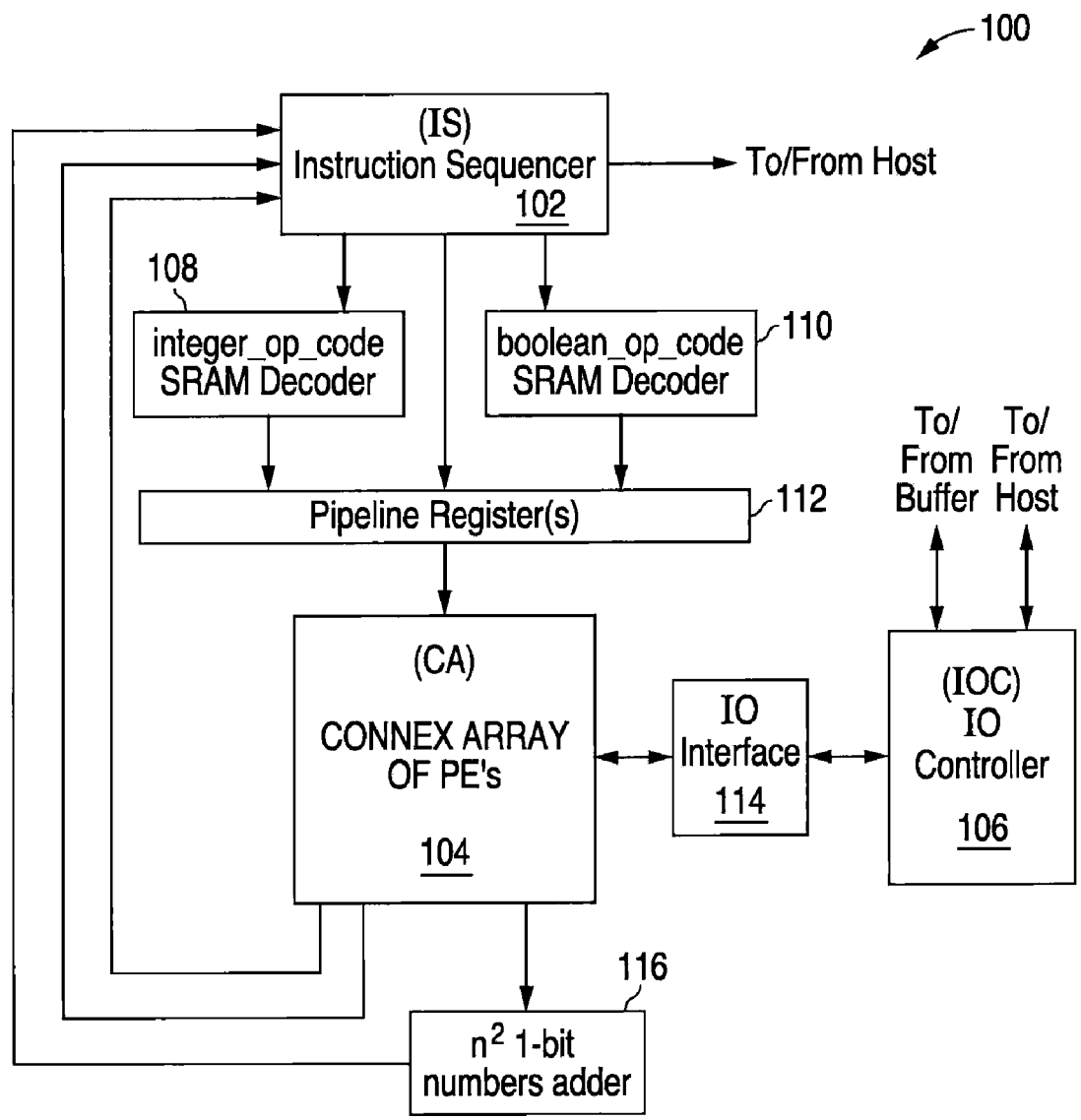
FIG. 1 illustrates a block diagram representation of a processor constructed in accordance with the invention, and including an integrated instruction sequencer, an array of processing engines, and an I/O controller.

FIG. 1 illustrates a processor of the invention in block diagram form. The processor 100 includes an instruction sequencer 102, an array 104 of processing engines, and an I/O controller 106. The instruction sequencer 102 receives tasks from a host (not shown), and transforms each task into sequences of instructions for proper use by the array 104. To facilitate the support of multiple different applications, decoders 108, 110 can decode instructions from the instruction sequencer 102, translating the instructions for various applications to corresponding native instructions understood by the array 104. Instructions are then fed to the pipeline registers 112, where they are fed sequentially to the array 104.

The array 104 is also configured to handle I/O data. The I/O controller 106 receives I/O data from the host or from an external memory, and transfers it to an I/O interface 114, where it is formatted for the local memories of individual processing engines of the array 104. As will be further explained below, the processor 100 includes the ability to transfer I/O data to individual processing engines in a number of ways, to maximize efficiency and speed.

When the processing engines have finished performing their various operations on their data, including shifting the data amongst the processors, the data is shifted out of the array 104. I/O data is shifted out to the I/O controller 106, while other data is shifted out to the instruction sequencer 102 for transfer to the host, via an adder 116 if desired.

Figure 2:
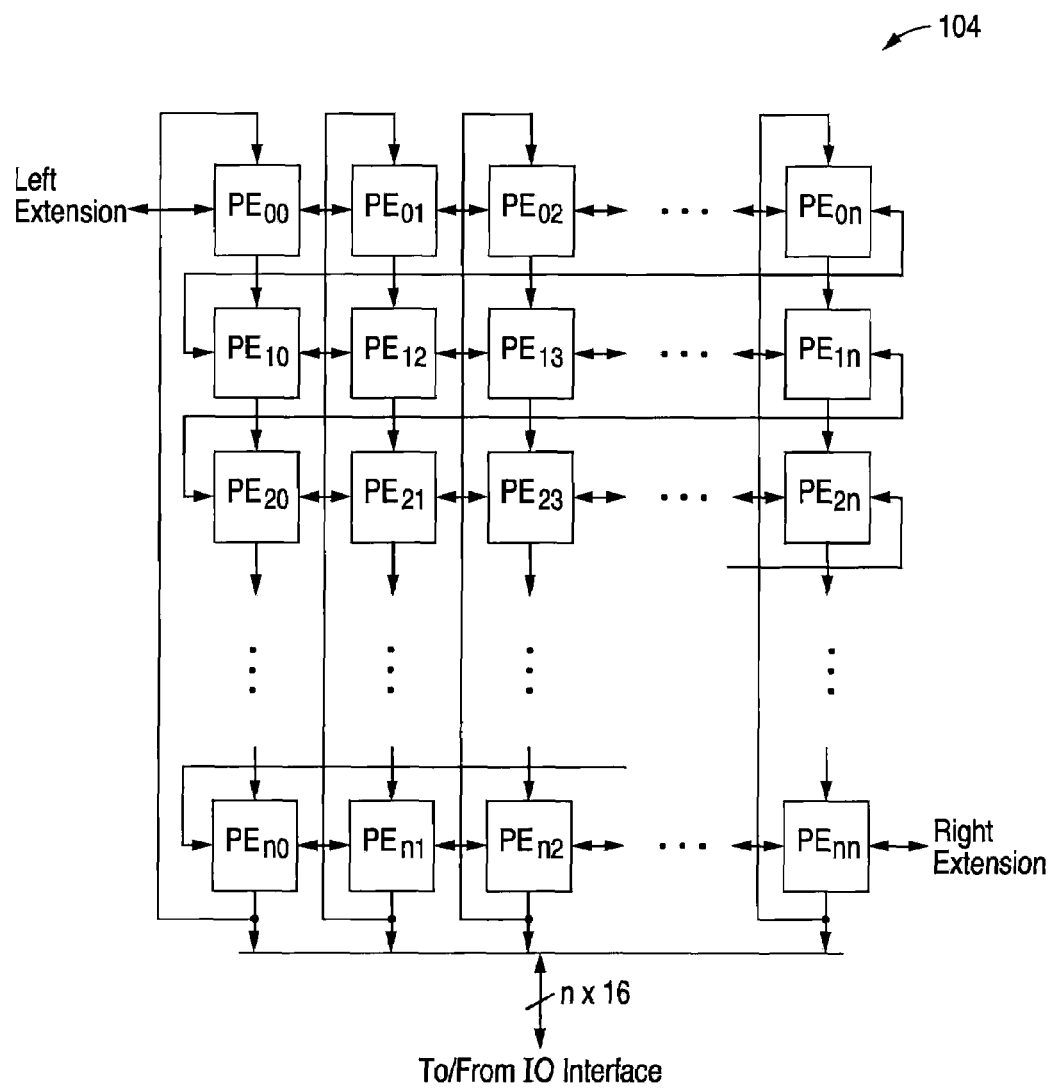
FIG. 2 illustrates further details of processing engines constructed in accordance with the invention, as well as their interconnection.

As can be seen from the above description, the processing engines have the capacity to simultaneously transfer I/O data and perform operations on other data, adding to the speed and efficiency of the processor 100. This is accomplished partly by the structure of the processing engines within the array 104 itself. FIG. 2 illustrates the interconnections between processing engines in the array 104. In this embodiment, the array 104 is constructed as a two dimensional array of processing engines $PE_{ij}$. The processing engines $PE_{ij}$ are serially interconnected in rows and columns. That is, the processing engines $PE_{ij}$ are arranged in rows and columns, with each processing engine $PE_{ij}$ able to exchange data with its neighboring processing engines, both in its row and in its adjacent columns. The processing engines at the end of each row are able to exchange data with the first processing engine of the next row, and vice versa. Similarly, the processing engines at the end of each column are able to transfer data to the first processing engine in the same column. The processing engines can thus be configured to transfer I/O data and other data both column-wise and row-wise.

In this manner, the I/O controller 106 transfers I/O data (perhaps after formatting by the I/O interface 114) to various processing engines, which transfer the I/O data serially down their respective columns. Simultaneously, this I/O data, or other data inserted into the various processing engines accompanying instructions from the instruction sequencer 102, can be operated on by each processing engine and shifted row-wise. In this manner, the array 104 can both transfer I/O data as well as simultaneously perform various operations on that or other data.

It can be seen that this ability to handle both I/O data and other forms of data, as well as the ability to perform operations on both, confers advantages over other systems. First, it yields faster and more efficient processing, as data transfers can be performed in parallel with calculations and other data manipulations. Second, it allows the processor 100 to be effectively optimized to handle the computational processes most often seen by modern computers. That is, it has been found that many computational processes are either "I/O bounded" or "computation bounded." I/O bounded processes are dominated by the need to transfer large amounts of data without performing significant computational operations upon that data, e.g., multimedia file playback, file copying, or other transfers of large amounts of data). Conversely, computation bounded processes are dominated by the need to perform calculations, e.g., graphics rendering, simulations, and the like. By incorporating dedicated hardware for both I/O data transfer and computations, the processor 100 handles I/O bounded processes and computation bounded processes faster and more efficiently than other processors.

Figure 3:
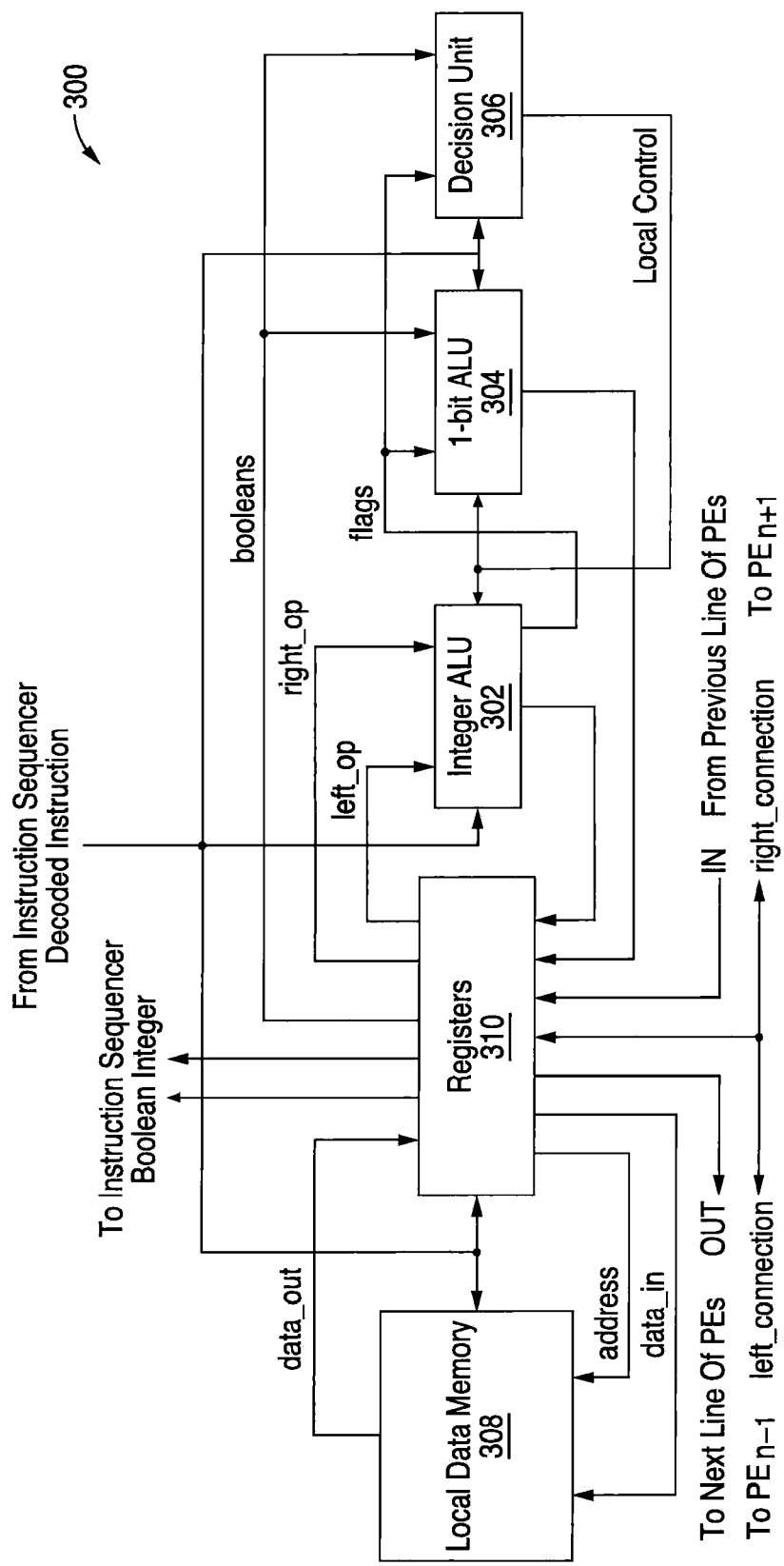
FIG. 3 illustrates a block diagram representation of an individual processing engine in accordance with the invention.

While one aspect of the processor 100 includes a dedicated I/O controller 106 and instruction sequencer 102 for handling I/O data and instructions, the construction of the processing engines $PE_{ij}$ themselves also contributes to advantageous handling of I/O bounded and computation bounded processes. FIG. 3 illustrates a block diagram representation of an individual processing engine $PE_{ij}$ in accordance with the invention. In this embodiment, each processing engine 300 includes an integer ALU 302, a 1-bit ALU 304, and a decision unit 306 that either execute, or facilitate the execution of, various operations. The processing engine 300 also includes a local data memory 308 and registers 310. As shown, the integer ALU 302, 1-bit ALU 304, and decision unit 306 are connected so as to operate in parallel with each other. In particular, the 1-bit ALU 304 and decision unit 306 can send their current logic states to the integer ALU 302 as well as modify those states in the same clock cycle.

In operation, the processing engine 300 receives sequenced instructions from the instruction sequencer 102. The instructions are sent to the integer ALU 302, as well as to the registers 310 and local data memory 308. The instructions are also sent to the 1-bit ALU 304 and decision unit 306.

Instructions requiring computation direct the registers 310 and/or local data memory 308 to transfer data to the integer ALU 302 for processing. In the embodiment shown, the data can be transferred from the registers 308 to the integer ALU 302 as left and right operands, although the invention includes any form of data transfer among the local data memory 308, registers 310, and integer ALU 302. The instructions also modify the logic state of the 1-bit ALU 304. In this embodiment, the 1-bit ALU 304 stores a single bit whose two binary logic states are read by the integer ALU 302. Instructions from the instruction sequencer 302 can direct the integer ALU 302 to read the logic state of the 1-bit ALU 304 and execute different operations depending on the logic state. For example, an instruction can direct the integer ALU 302 to add its data to data from a neighboring processing engine 300 if the logic state is binary "0", or subtract its data from that of the neighboring processing engine 300 if the logic state is binary "1." In this manner, the 1-bit ALU 304 allows a single instruction to represent more than one operation. The instructions also modify a decision state stored in the decision unit 306. This decision state indicates whether the particular processor is "marked" for execution of its instruction, or "unmarked" and thus directed not to execute its instruction. This allows the instruction sequencer 102 to selectively instruct individual processing engines 300 to carry out operations, or to avoid carrying out operations, as necessary. This allows the array 104 to execute more complex and detailed processes.

It should be noted that the integer ALU 302, 1-bit ALU 304, and decision unit 306 are arranged in parallel, so that the 1-bit ALU 304 and decision unit 306 can modify their states in the same clock cycle as the integer ALU 302 carries out its operations. This speeds the operation of each processing engine 300, as the integer ALU 302 can thus carry out a new operation each clock cycle, rather than having to wait for the 1-bit ALU 304 and decision unit 306 to update first.

The local memory 308 and registers 310 store data and instructions needed for the operations performed by the integer ALU 302. The registers 310 are in electronic communication with the registers of adjacent processing engines 300 (both row-wise and column-wise), and thus allow data to be exchanged between adjacent processing engines 300. The local memory 308 can exchange data with the registers 310, so that data can be shifted from the registers 310 into the local data memory 308 for storage as necessary. This data can then be retrieved by the registers and either sent to the integer ALU 302 for processing, or shifted into the registers of adjacent processing engines 300 for eventual transfer out of the array 104.

In addition to helping improve the computational abilities of the processing engines 300, the local data memory 308 and registers 310 also allow for the transfer of I/O data. As above, the I/O controller 106 and/or I/O interface 114 can place I/O data into various processing engines 300, typically by transferring data to the registers 310. If calculations are required on this I/O data, they can be performed as above, and if not, the I/O data can be shifted down column-wise out of the array 104 and to the host. Alternatively, it can be shifted into the local data memory 308 for future processing or transfer.

Figure 4:
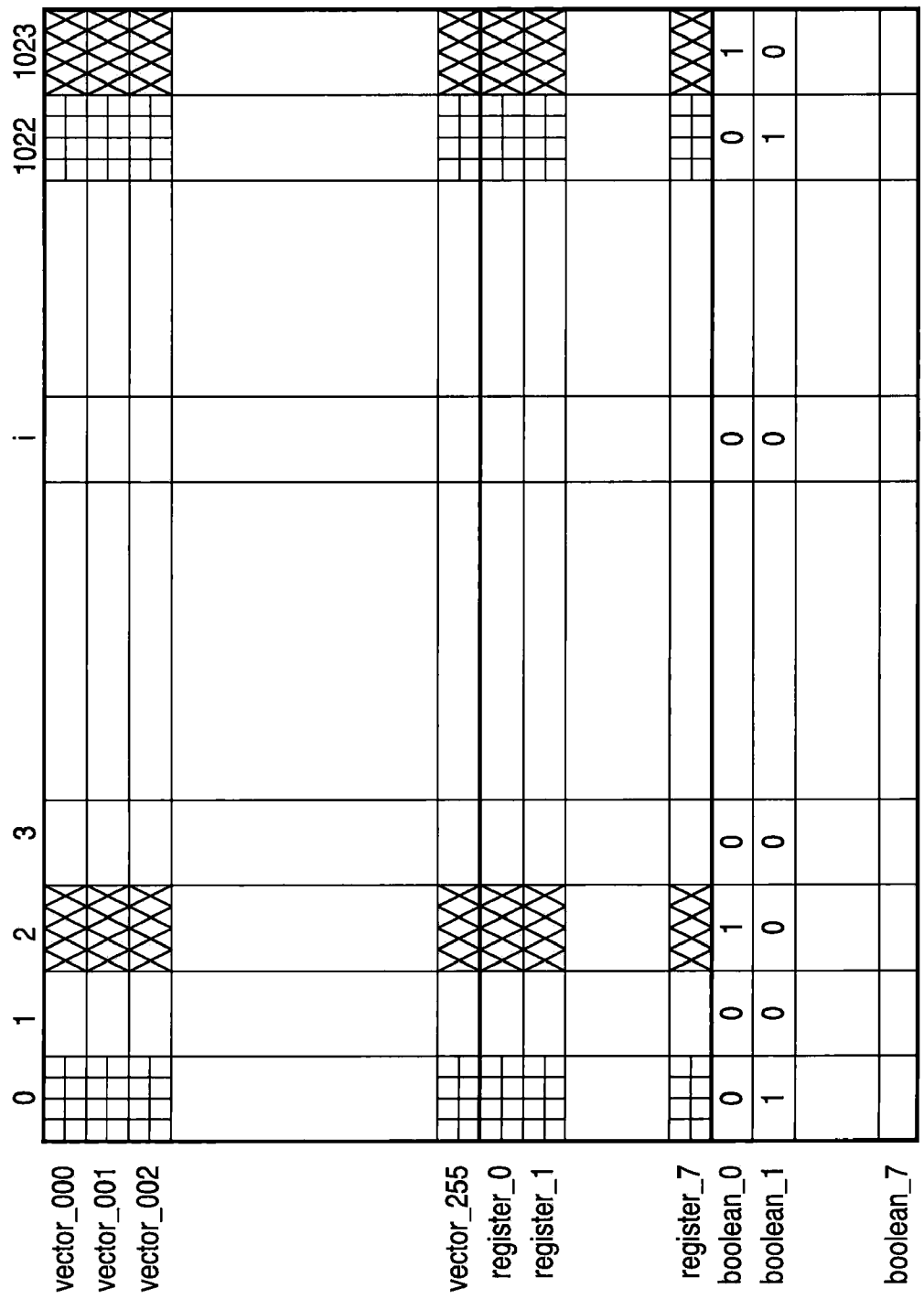
FIG. 4 is a vector representation of commands to be executed by the processing engines of FIG. 3.

One of ordinary skill in the art will realize that the invention encompasses any size for the various memories and instructions of the invention. However, in at least one embodiment, the processing engine 300 has a local data memory 308 that can hold at least 256 16-bit words. The register 310 can hold at least 8 16-bit words, as well as 8 Boolean bits for selecting the active components of the integer vectors for processing in the integer ALU 302. FIG. 4 illustrates a vector representation of such an embodiment (a vector being simply a representation of data), where 1024 processing engines 300 are shown along the top of the chart, while the various vectors, registers, and Boolean bits of each engine 300 run along the side. From this, it can be seen that instructions and data can be thought of as being transmitted to the processing engines 300 as vectors, e.g., vector_000 is a 1024-component vector of data, each component of which is 16-bits long and is sent to one processing engine 300. Similarly, vector Boolean_0 is a 1024-component vector of single bits, each of which is transmitted to the 1-bit ALU 304 of a processing engine 300. It can also be seen that each processing engine 300 can be represented as a column of FIG. 4, able to store 256 16-bit words of data, 8 16-bit words of register information, and 8 Boolean bits. For example, processing engine "0" can store the first 16-bit word from each of vector_000-vector_255 in its local data memory 308 for shifting down column-wise or for manipulation in its integer ALU 302. It can also store the first 16-bit word from each of register_0-register_7 in its registers 310 as queued instructions or transferred data, and the first bit from each of boolean_0-boolean_7 in its registers 310 or 1-bit ALU 302 as queued logic states.

The basic operation of the processor 100 having been illustrated, attention now turns to a more detailed explanation of certain noteworthy features of the invention that convey particular advantages.

Instruction Decoding

The first such feature relates to the decoding of instructions. As mentioned above, the instruction sequencer 102 can include decoders 108, 110 for decoding instructions. These decoders 108, 110 can store microcode instructions corresponding to the instruction sets of any applications. The instruction sequencer 102 then transmits sequenced instructions to the decoders 108, 110, which retrieve the corresponding microcode instructions and transmit them to the processing engines 300 of the array 104. This allows the processor 100 to be compatible with any application, so long as microcode corresponding to instructions for that application can be stored in the decoders 108, 110.

In some embodiments, it is preferred that the decoders 108, 110 are SRAM decoders, which allows users to periodically update or otherwise alter the stored instruction sets, although the invention encompasses decoders 108, 110 that employ any form of memory for storing microcode instructions corresponding to the instructions for various applications. Also, it is sometimes preferred that one decoder 108 is dedicated to storing the operation codes of the integer ALU 302, while the other decoder 110 is dedicated to storing Boolean operation codes for the 1-bit ALU 304. One of ordinary skill in the art will realize that the invention is not limited to embodiments including two separate decoders 108, 110, although it is sometimes preferable to include separate decoders 108, 110 for integer and Boolean operation codes, so as to allow for independent changes to be made to either. In addition, it should be noted that as the decoders 108, 110 can store microcode corresponding to multiple applications, the stored microcode is often longer than the instructions received from the host. Thus, it is often the case that the decoders 108, 110 act to effectively expand these received instructions. For example, while the host instructions may only be 8- or 16-bit instructions, the expanded microcode instructions stored in the decoders 108, 110 can be 64-bit microcode instructions (allowing for $2^{64}$ possible unique instructions). Thus, even though the processor 100 may receive relatively small instructions like 8- or 16-bit instructions, it may work internally with larger 64-bit instructions.

Data Addressing

The second such feature concerns data addressing. The I/O controller 106 and/or I/O interface 114 can transmit I/O data to any processing engine 300. That is, data can be transmitted to any arbitrarily selected processing engine 300. This allows for more efficient use of the array 104, as I/O data can be preferentially sent to those processing engines 300 that are less active and able to more immediately handle the data.

In one embodiment, the arbitrary selection of particular processing engines 300 is accomplished by first instructing each processing engine 300 to transmit an available address in its local memory 308 to the I/O controller 106. The addresses can be any format, but it is often convenient to transmit the addresses as a vector, where each element of the vector represents a different processing engine 300. Each element can thus be filled by the position in the local data memory 308 that is available to hold data, if any. A zero value can represent a processing engine 300 that is unavailable for I/O data. In this manner, each processing engine 300 is directed to transmit a position in its memory 308, and these positions are assembled into a vector that effectively contains the identities of each available processing engine 300 and the available memory positions of each. This vector allows the I/O controller 106 to quickly determine where it can transfer I/O data.

One of ordinary skill in the art will realize that these vectors can also be used in the transfer of data to/from memories external to the processor 100. For instance, the array 104 can be instructed to construct a vector containing addresses to be used in accessing an external memory. This vector can then be transferred out through the I/O controller 106 to address desired portions of the external memory for data transfer to/from that external memory.

One of ordinary skill in the art will also realize that these vectors can be used in the retrieval of data, i.e., processing engines 300 can be instructed to transmit memory positions of I/O data they store, and these positions can be assembled into a vector informing the I/O controller 106 of the addresses at which it can retrieve data from the processing engines 300. One of ordinary skill will also realize that this approach increases the overall efficiency of the processor 100, as a single instruction from the instruction sequencer 102 allows all available processing engines 300 to be identified, and data to be transferred to/from only those processing engines.

Data Formatting

The third such feature concerns data formatting. As above, the I/O controller 106 and/or I/O interface 114 can format data to fit the local data memories 308 of the processing engines 300. The invention encompasses the use of any data format. For example, the I/O controller 106 can load/store data in shuffled mode, direct transfer mode, and indirect transfer mode. The I/O controller 106 can also perform byte expanded loads and byte compacted stores, as well as word expanded loads and word compacted stores.

The above mentioned data formats are known. However, illustrative examples are beneficial. In shuffled mode, data from the host is divided into two vectors, one vector having the even-numbered words and one vector having the odd-numbered words. That is, if the host transmits data in 16-byte word format, each processing engine 300 stores data in 16-bit format, and the array 104 contains 1024 processing engines 300, then the I/O controller 106 can accumulate a 2048-component double-length vector of data from the host, [w0, w1, . . . , w2047], where each component wi is a 2-byte word. The I/O controller 106 then breaks this vector up into two 1024-component vectors:

v1=[w0, w2, . . . , w2046]

and v2=[w1, w3, . . . , w2047]

The two 1024-component vectors are then sent to the 1024 processing engines 300, where each 2-byte (i.e., 16-bit) component is already formatted for storage in the registers 310 and local data memory 308. In this manner, the I/O controller 106 breaks up host-formatted data into two 1024-component vectors, each component of which contains data formatted for the processing engines 300.

For byte expanded loads, the I/O controller 106 can accumulate 512 2-byte words [w0, w1, . . . , w511], which are then divided into 1024 2-byte words, with the most significant byte of each word set to zero:

{8'b0, w0[7:0]}, {8'b0, w0[15:8]},

{8'b0, w1[7:0]}, {8'b0, w1[15:8]},

. . .

{8'b0, w510[7:0]}, {8'b0, w510[15:8]},

{8'b0, w511[7:0]}, {8'b0, w511[15:8]},

In other words, each byte from external memory is stored as a 16-bit number with the most significant byte zero. Conversely, for byte compacted stores, a vector of stored 16-bit numbers [w0, w1, . . . , w1023] is retrieved, and the zero-value most significant bytes are stripped out to yield 1024 2-byte words again: {w0[7:0], w1[7:0], . . . , w1023[7:0]}.

For word expanded loads, the I/O controller 106 can accumulate a vector of 512 2-byte words [w0, w1, . . . , w511], which are then converted to 1024 2-byte words, where every other 2-byte word is set to zero. The 1024 2-byte words are then loaded into the array 104 as vector:

[w0, 16'b0, w1, 16'b0, . . . , w510, 16'b0, w511, 16'b0]

Conversely, for word compacted stores, every other 2-byte word (i.e., the zero-value words) is stripped out to once again achieve a vector of 512 2-byte words: [w0, w2, . . . , w1020, w1022].

In direct transfer mode, the I/O controller 106 uses a specified increment, and transfers data to the processing engines 300 based on this increment. For example, if the increment is 2, the I/O controller 106 transfers its data to every other processing engine 300. In contrast, indirect transfer mode involves addresses provided by each processing engine 300, similar to the data addressing techniques described above. For instance, each processing engine 300 is instructed to provide its address based on whether it is sufficiently available to receive data. The I/O controller 106 then transmits its data to the processing engines 300 that it has received addresses from.

Arithmetic Operations

It should be recognized that the ability of each processing engine 300 to shift data to and from adjacent processing engines 300, coupled with the ability of the instruction sequencer 102 to selectively mark engines 300 for executing computational operations, allows for great flexibility and speed in computation, providing for much faster computation bounded processes. In particular, a single instruction from the instruction sequencer 102 can instruct every processing engine 300 in the array 104 to execute varying operations, with different engines 300 instructed to perform different operations according to the logic states set individually by the instruction, or instructed not to perform any calculations at all. In this manner, each individual instruction can control a "global" set of operations that can vary as necessary from engine 300 to engine 300. For example, the array 104 can perform functions such as sequential multiplication algorithms much faster. Multiplication can be performed using a process which inspects 2 bits in each step, decides the appropriate addition, and performs two position shifts. This can be accomplished with only three instructions (init_mult, mult, end_mult, each having specific microcode generated by the programmable decoders 108 and 110) in the processor 100, thus greatly speeding multiplication. Here, two bits of multiplicand can be tested in each cycle:

If $\{b(i), b(i-1)\}=00$, then the partial result is shifted two binary positions right.

If $\{b(i), b(i-1)\}=01$, then the multiplier is added, and the result is shifted two binary positions right.

If $\{b(i), b(i-1)\}=10$, then the multiplier is shifted one binary position left, and the result is shifted two binary positions right.

If $\{b(i), b(i-1)\}=11$, then the multiplier is subtracted, the result is shifted two binary positions right, and the multiplier is added in the next clock cycle.

In each cycle, the result is stored back in two registers, with the final result stored in a pair of registers as well.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. Many modifications and variations are possible in view of the above teachings. For example, the array 104 need not be limited to a two dimensional array of rows and columns, but can be organized in any manner. Also, while certain components such as the SRAM decoders 108, 110 and I/O interface 114 may be desirable in certain embodiments, they are not required for the practice of the invention. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer system, comprising:
an instruction sequencing unit configured to sequence instructions for manipulating data and to transmit the sequenced instructions;
an array of processing engines configured to receive instructions corresponding to the sequenced instructions, each processing engine of the array of processing engines being configured to receive the data, and having:
a first memory configured to store the data;
a decision unit configured to store decision state;
a Boolean unit configured to store a logic state and to modify the logic state as dictated by the received instructions;
an integer unit configured to conditionally perform integer operations on the stored data as dictated by the stored decision state, the received instructions, and the logic state, so as to generate integer result data; and
a second memory configured to store I/O data;
wherein the Boolean unit is configured to modify the logic state in the same clock cycle as the integer unit performs the integer operations; and
an I/O controller separate from the instruction sequencing unit configured to transmit the I/O data to, and receive the I/O data from, the array of processing engines in parallel with the sequencing of instructions and the transmitting of the sequenced instructions by the instruction sequencing unit.

2. The computer system of claim 1 further comprising an I/O interface in communication with the array of processing engines and the I/O controller, the I/O interface configured to format the I/O data for storage in the second memories of the processing engines.

3. The computer system of claim 2 wherein the I/O interface is further configured to format the I/O data for loading in the second memories in shuffled mode.

4. The computer system of claim 2 wherein the I/O interface is further configured to format the I/O data by byte expanding the I/O data.

5. The computer system of claim 2 wherein the I/O interface is further configured to format the I/O data by word expanding the I/O data.

6. The computer system of claim 2 wherein the I/O interface is further configured to format the I/O data for loading in the second memories in direct transfer mode.

7. The computer system of claim 2 wherein the I/O interface is further configured to format the I/O data for loading in the second memories in indirect transfer mode.

8. The computer system of claim 1 further comprising a decoder unit in communication with the array of processing engines and the instruction sequencing unit, the decoder unit having a memory storing an instruction set having expanded instructions corresponding to the sequenced instructions received from the instruction sequencing unit, the decoder unit further configured to:
receive the sequenced instructions from the instruction sequencing unit;
retrieve from the memory those expanded instructions corresponding to the sequenced instructions received from the instruction sequencing unit; and
transmit the retrieved expanded instructions to the array of processing engines.

9. The computer system of claim 8 wherein the memory is an SRAM memory.

10. The computer system of claim 8 wherein the sequenced instructions are 8-bit instructions, and the expanded instructions are 64-bit microcode instructions.

11. The computer system of claim 1 wherein:
the decision state selectively designating the processing engines as marked processing engines and unmarked processing engines;
the processing engines are configured to perform the integer operations upon the designating as marked processing engines; and
the processing engines are configured to suspend the integer operations upon the designating as unmarked processing engines.

12. The computer system of claim 1 wherein:
the processing engines are serially interconnected in an array having a first direction and a second direction;
the processing engines are configured to shift the I/O data sequentially along the first direction; and
the processing engines are configured to shift the stored data along the second direction, so as to form shifted stored data.

13. The computer system of claim 12 wherein the processing engines are further configured to facilitate execution of arithmetic functions by executing at least one of the integer operations on the shifted stored data.

14. The computer system of claim 1 wherein the integer unit and the Boolean unit are configured to execute their respective operations in parallel.

15. The computer system of claim 1 wherein each of the processing engines is further configured to perform:
a first operation upon the stored data as dictated by one of the received instructions, when the Boolean unit stores a first logic state; and
a second operation upon the stored data as dictated by the one of the received instructions, when the Boolean unit stores a second logic state.

16. The computer system of claim 15 wherein the first operation and the second operation each are a shift operation shifting the stored data to another one of the processing engines, or an arithmetic operation.

17. The computer system of claim 1 wherein:
the instruction sequencing unit is further configured to instruct ones of the processing engines to generate addresses; and
the ones of the processing engines are further configured to generate addresses and to transmit the generated addresses to the I/O controller.

* * * * *